Oct. 26, 1943.                    H. J. FINDLEY                      2,332,707
                        AUTOMOBILE AIR CONDITIONING DEVICE
                        Filed Jan. 16, 1941         3 Sheets-Sheet 1

INVENTOR.
Howard J. Findley
BY John F. Stark
ATTORNEY.

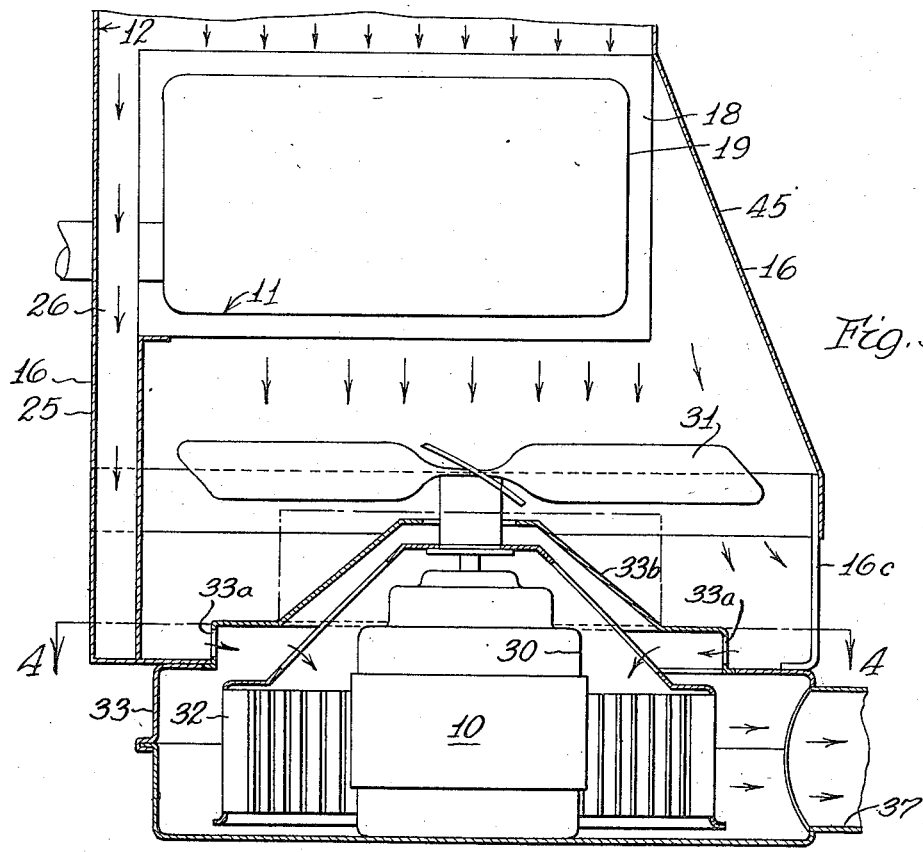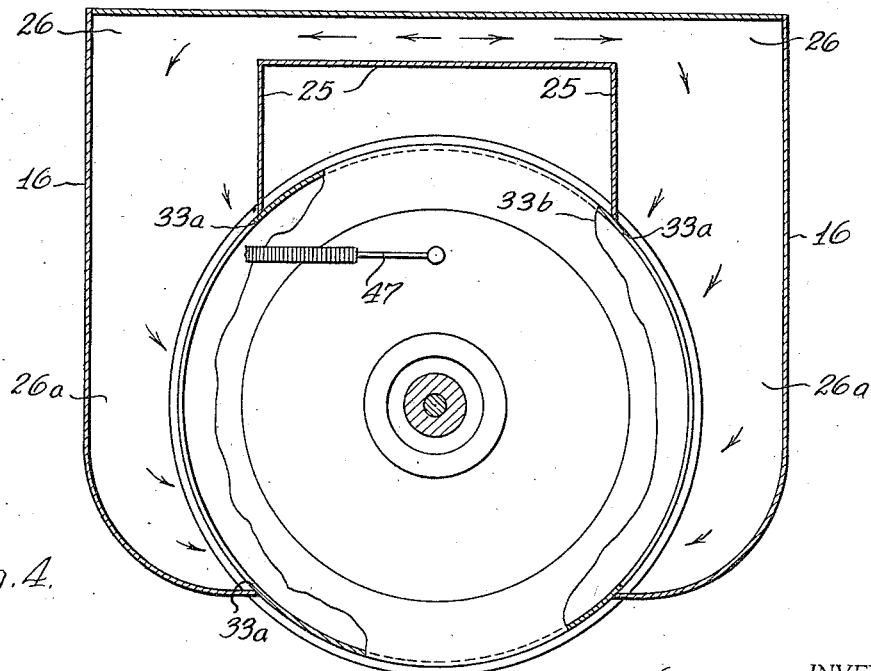

Oct. 26, 1943.   H. J. FINDLEY   2,332,707
AUTOMOBILE AIR CONDITIONING DEVICE
Filed Jan. 16, 1941   3 Sheets-Sheet 3

INVENTOR.
Howard J. Findley
John F. Stark
BY

Patented Oct. 26, 1943

2,332,707

UNITED STATES PATENT OFFICE 2,332,707

AUTOMOBILE AIR CONDITIONING DEVICE

Howard J. Findley, Shaker Heights, Ohio, assignor to Eaton Manufacturing Company, Cleveland, Ohio, a corporation of Ohio Application January 16, 1941, Serial No. 374,661

2 Claims. (Cl. 257—137)

This invention relates to air conditioning heat-exchangers, for automobiles in general, and more particularly, concerns an improved device for supplying selective types of conditioned air to designated sections of an automobile.

Among the objects of this invention is the provision of a vehicle body heat-exchanger having air impelling means for moving air therethrough and/or away therefrom to a selected portion of the vehicle, including means for supplying fresh and/or recirculated air to, through, or around the heat-exchange core for distribution by said air impelling means in selected tempered or unheated condition; the provision in a vehicle body heat-exchanger, as above described, of ventilating means for supplying fresh or recirculated heated air to the air impelling means thereof for distribution to a selected location of the vehicle compartment; the provision in a vehicle body heat-exchanger, as above described, of movable housing means enveloping the centrifugal air moving means, and adjustable axially for reception of fresh air or recirculated heated air thereinto from opposite ends of the centrifugal rotor according to the setting of the opening in said movable housing; the provision in a vehicle body heat-exchanger, as above described, of means for supplying fresh air thereto in which said fresh air supply passes through the heater casing before being conducted to the air distributing system.

A further object of the invention is the provision of a vehicle body heat-exchanger and ventilating system therefor in which the heat-exchange core thereof has normally heated air passages therethrough provided with valve means in the core header tank for providing an unheated transfer of air through a portion of the passages in the core; or in which valve means are associated with said ventilating system for provision of a change over from a source of fresh to recirculated air.

Further and other objects and advantages of the invention reside in the novel combination and arrangement of parts, to be hereinafter described, when considered in conjunction with the accompanying drawings forming a part of this specification, and pointed out with particularity in the appended claims.

In the drawings like reference characters refer to corresponding parts throughout the several views, and in which:

Fig. 3 is a vertical sectional view through a modified form of vehicle heater embodying other ventilating means; and Fig. 4 is a sectional plan view illustrating the ventilating system of the heater in Fig. 3, and taken substantially on the line 4—4 thereof.

Figure 1:
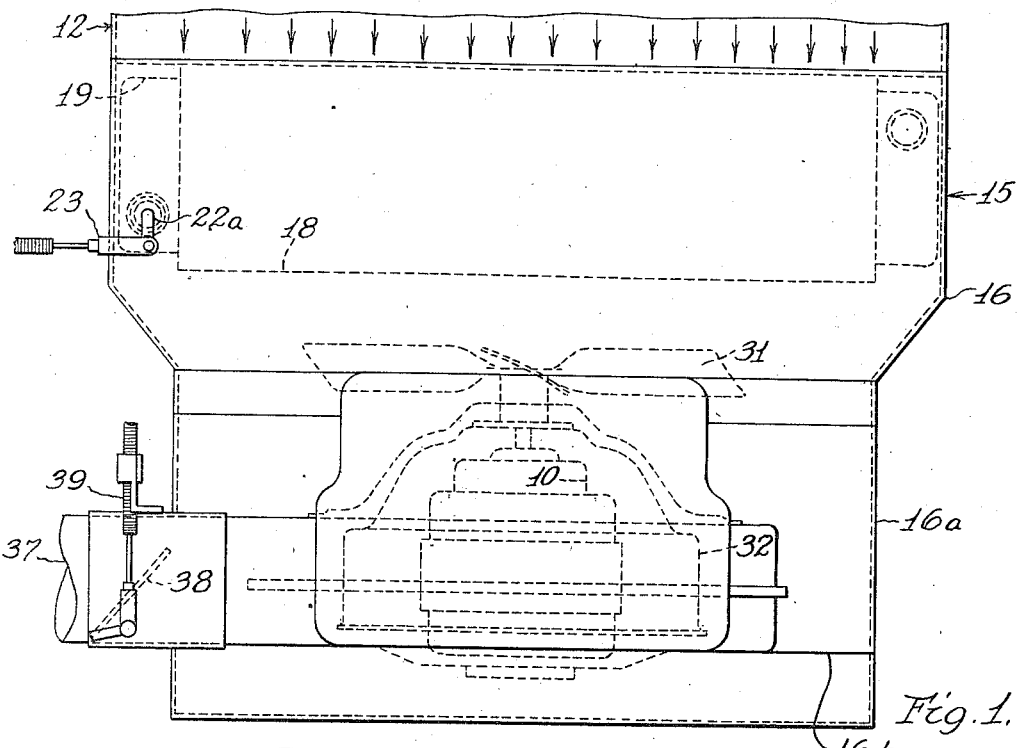
Fig. 1 is an elevational view of a heat-exchanger incorporating features of this invention.

It is well known to provide a fresh air ventilating system in conjunction with vehicle heaters to temper or condition the air of a vehicle body for comfortable occupation thereof, and recently it has been suggested to provide unheated fresh air to the heater blower system for defrosting the vehicle windshield. It has also been found, under certain operating conditions, that the use of unheated fresh air from outside the vehicle, or unheated recirculated air of the vehicle body, for use in de-steaming or defrosting the vehicle windshield is not a complete answer to the problem and that some means of blending heated air therewith, or heated air in toto, if desired, should be provided. Accordingly, to this end, the several specific embodiments of the present invention disclose alternative forms of constructions which provide improved results in heating and ventilating the vehicle body and windshield.

In the several heat-exchangers shown the structures may be broken down for convenience into corresponding component parts, such as, the air impelling unit generally designed 10, the heat-exchange unit generally designated 11, and the fresh air supply means 12. Of these several units, the blower unit 10, and heat-exchange unit 11 remain substantially constant throughout, while the fresh air supply means is modified in each instance to illustrate alternative structure, which in some cases may necessitate slight modification in the core unit header tank or the blower unit housing.

Figure 2:
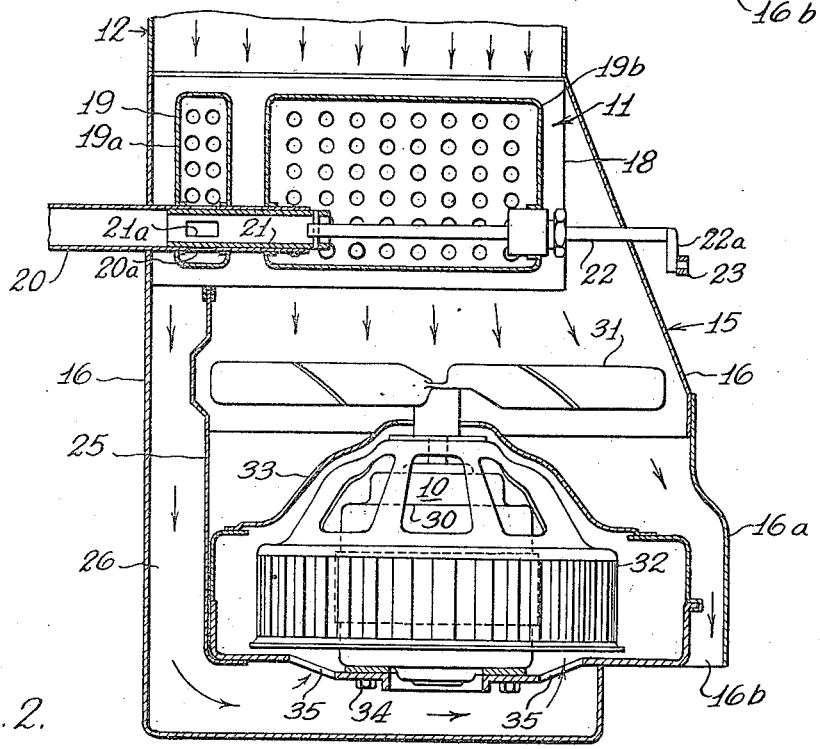
Fig. 2 is a vertical sectional view through the heater of Fig. 1.

Now having reference to Figs. 1 and 2 there is shown, in this instance a heat-exchanger, generally designated 15, which has a casing structure 16 enveloping the heat-exchange unit 11 and the air impelling unit 10. The upper end of the casing 16 is open and adapted to be joined with the fresh air supply means 12 which is merely an air chute depending in sealed relation from the usual vehicle cowl ventilator opening (not shown) in any well known manner, and into which air from outside the vehicle is forced under static pressure by forward movement of the vehicle. The opposite lower end of the casing 16 terminates in a reduced open portion over which is positioned a hollow casing member 16a which surrounds the air impelling unit 10 in spaced relation and has a lower discharge outlet 16b for delivery of tempered air directly to the passenger compartment.

The heat-exchange unit 11 is of the circulating fluid type receiving its heat-exchange medium from the engine cooling system and comprises a core 18 having a series of air channels therethrough for passage of air to be heated. Upon either end of the core are the usual header tanks, of which the tank 19 forms the inlet side thereof and has a supply pipe 20 joined therewith. The supply pipe 20 is extended into the header 19 and therethrough into separate or divided sections 19a and 19b thereof as best shown in Fig. 2. An outlet opening 20a in the pipe 20, where it passes through the section 19a of the heater tank, permits discharge of a portion of the heat-exchange medium through a complementary opening thereinto, while the remainder of the heat-exchange medium is discharged through the mouth of the pipe 20 into the separate section 19b of the header tank. A hollow, open-ended, sleeve member 21 is rotatably fitted into the open end of the supply pipe 20 a sufficient distance to extend partly in each section 19a and 19b of the header tank, and has adjacent one end thereof an opening 21a overlying the opening 20a and arranged to communicate therewith at selected intervals. Upon the opposite end of the sleeve 21 an actuating rod 22 is secured thereto and extended outward in sealed relation through the core tank 19b where it terminates beyond the outer casing wall in an offset crank arm 22a which may be controlled thereat or any remote point of the vehicle, as from the instrument panel, by the Bowden wire 23, shown in Fig. 1. The rotation of the sleeve 21 to communicate or block off the portion of the core tubes fed by the header tank 19a is for a purpose to be presently described. Adjacent the lower face of the heat-exchange core 18, below the section of the core tubes in communication with the header tank 19a, is a casing partition wall 25 parallel to the rear wall of the outer casing 16 and which defines a separate air chamber 26.

The air impelling unit 10 is of the twin fan motor driven type and comprises a motor 30, having a propeller fan 31 and a centrifugal blower 32 mounted upon one end of the motor shaft thereof. A blower housing 33 envelopes the blower fan 32 and fan motor 30, concentrically disposed in the hollow hub thereof, which is supported by the lower wall of the housing and secured thereto in any suitable manner by the fastening means 34. The lower end of the partition wall 25 is turned inward against the bottom of the blower casing 33 and the rear casing wall 16 is likewise turned inward parallel thereto and extended laterally a sufficient distance to cover the air intake 35 in the lower wall of the blower casing, thus providing a lateral extension of the air chamber 26. The blower housing has a circumferential air outlet 37 controlled by a valve 38 which may be actuated remotely by the Bowden wire 39. Over the outlet one or more conduits may be secured to conduct air from the blower housing under pressure to the vehicle windshield for defrosting or de-steaming.

The use and operation of the heat-exchanger is as follows:

Upon forward motion of the vehicle the cowl ventilator is open and in communication with the fresh air supply means 12 whereby fresh air from outside the vehicle will be forced thereinto and contact the air passages through the heat-exchange core 18. When the speed of the vehicle is too slow, or at rest, to supply a sufficient static head of fresh air to the core the air impelling unit is energized and the propeller fan 31 will move air to be heated through the core and discharge heated air from casing outlet 16b directly to the passenger compartment.

If it is desired to defrost the windshield the air impelling motor operates the blower 32 under full load and air moving capacity, and assuming that heat-exchange medium is flowing through core section 19a, then fresh air will be moved through the core and heated therein; after which it may pass through the air chamber 26 and be inducted into the blower casing 33 from which it is discharged radially through the outlet 37 to conduit means for delivery to the vehicle windshield.

If weather conditions are such that a dry snow is falling and movement of the vehicle through the air stream will blow the snow flakes off without sticking to the windshield, and the windshield is fogging-up on the inner side from the humidity adjacent thereto, and requires defogging, then, obviously, applying heat to the windshield, while clearing up the fog in the inner side thereof, will also cause the snow to melt and stick, or freeze if the vehicle speed is great enough. Accordingly, to this end, the rod 22 is actuated so that the heat-exchange medium flowing through the section 19a of the header tank, and core tubes in communication therewith, are shut off. Under this setting fresh air passed through the core 18 will be unheated and the air moved through the chamber 26 will be delivered in substantially an unheated condition to the blower casing for distribution to the vehicle windshield. From the foregoing it will be apparent that by a selective operation of the rod 22 either fresh tempered or unheated air may be supplied to the windshield by the blower casing, depending upon whether it is necessary to defrost or defog the windshield.

In the heat-exchanger, generally designated 45, shown in Figs. 3 and 4, substantially the same casing structure 16 is used to house the air impeller unit 10, the heat-exchange unit 11, and is associated with a similar fresh air supply means 12. In this instance the fresh air supplied to the upper face of the heat-exchanger is obtained from the vehicle cowl ventilator, under forward motion of the vehicle, as previously described. The lower end of the casing 16 terminates in a reduced portion to which are attached spaced casing straps 16c which support the air impelling unit 10 in spaced relation to the casing and permits discharge of tempered air directly to the passenger compartment from therebetween.

In this instance the heat-exchange unit 11 comprises a core element 18 but instead of having a divided inlet header tank 19, as in the previous instance, the core structure is of conventional form. And instead of having the casing partition wall 25 terminate at the lower face of the core 18 it is extended therebehind in spaced relation to the outer casing wall 16 so as to define a separate air chamber 26 which by-passes the longitudinal air passages through the core.

The air impelling unit 10 is of similar construction to that previously described, having a motor 30 and fans 31 and 32 mounted upon one end of the shaft thereof. The blower housing 33 enveopes the blower fan 32, but in this case has openings 33a pierced in the cone-shaped hub 33b of the casing which is arranged to rotate so as to be placed in communication, selectively, with the fresh air means or the heated air delivery from the propeller fan 31. A Bowden wire control 47 secured to the hub 33b offset from the center thereof provides for remote control movement of the hub through approximately a right angle. The partitioned air chamber 26 is in communication with the fresh air supply means 12 at its upper end and from which it extends downward behind the width of the core 18 forming a right angle bend at its lower end adjacent the hub 33b of the blower casing 33 where it is bifurcated into two arcuate branches 26a partially surrounding the movable casing hub, as best shown in Fig. 4. Diametrically opposite from the fresh air passages formed by the arcuate branches 26a surrounding a portion of the blower casing hub, the remaining circumference thereof is exposed to the air discharge of the propeller fan 31. A circumferential outlet 37 from the blower wheel casing 33 is arranged for reception of conduit means to extend adjacent the vehicle windshield, as in the previous device.

The operation of this heat-exchanger in so far as the fresh air intake is concerned is similar to the first construction. Fresh air from outside the vehicle is forced through the fresh air means and through the longitudinal heat-exchange passages of the core 18 where the propeller fan picks up the tempered fresh air and discharges it into the vehicle compartment. Concurrently with the fresh air delivered to the heat-exchange unit 11, air from the fresh air supply means 12 is also deflected into the partitioned air channel 26 forward of the core 18 and forced, or drawn downward through the lateral bifurcated passages 26a into the openings 33a, of the blower casing hub 33b, to one end of the blower fan 32 where unheated fresh air is delivered to the windshield surface from the outlet 37 of the blower casing 33. Under certain operating conditions, for example if it is desired to defrost the windshield, the Bowden wire control 47 is adjusted so that the openings 33a, in the cone shaped hub 33b of the blower wheel casing 33, are rotated approximately 90° so as to be open for reception of the heated air delivery from the propeller fan 31. Obviously, of course, any intermediate setting may be effected so as to blend the two streams to meet existing operating conditions.

Figure 5:
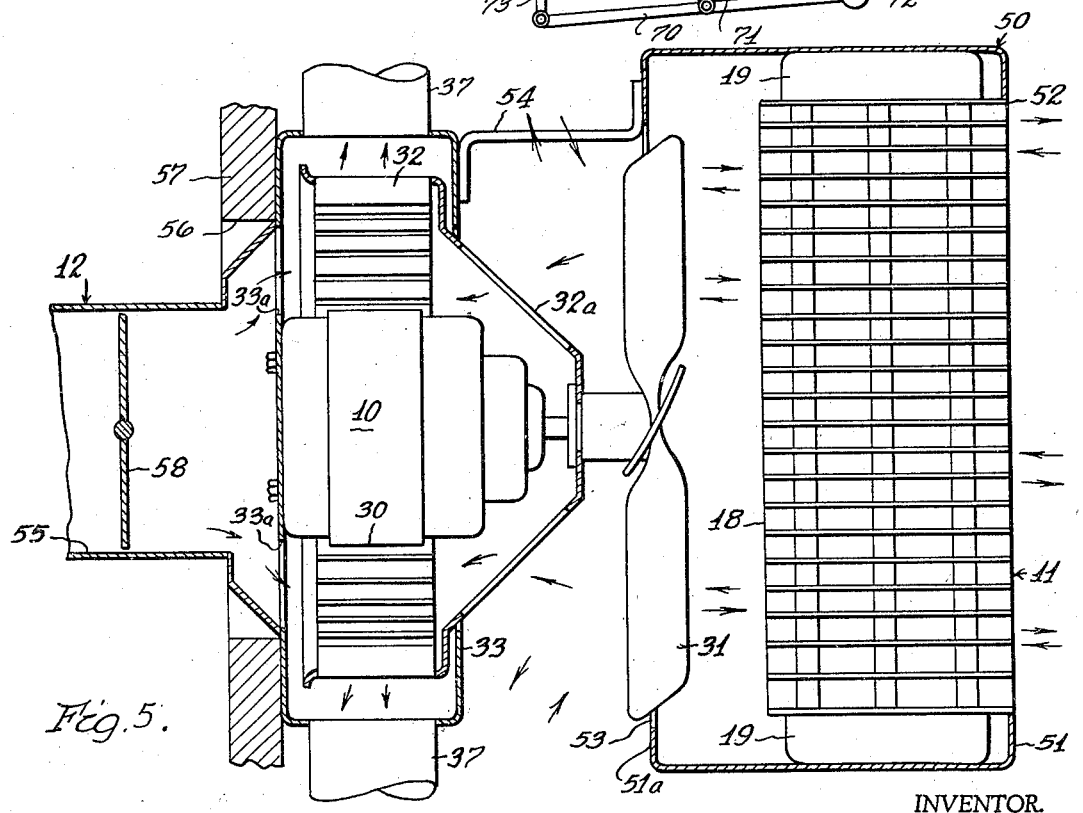
Fig. 5 is a sectional side elevational view of a modifier heater and ventilating structure embodying slightly different ventilating means in which the fresh air is supplied to the blower casing.

In the modification shown in Fig. 5 the heat-exchanger, generally designated 50, has the three units previously described, namely, the air impelling unit 10, the heat-exchange unit 11, and the fresh air supply means 12. In this instance, however, the heat-exchanger 50 has a casing 51, surrounding the outer edges of the heat-exchange unit 11, which comprises a conventional core 18 having the usual header tanks 19. The opposite longitudinal faces of the core, through which air is adapted to be moved are disposed, respectively, at the front face adjacent the casing discharge opening 52, and at the rear face adjacent the space 53, in communication with the passenger compartment. The rear wall of the casing is inturned as at 51a to form a ring in conjunction with spaced blower casing support straps 54, in which the fan of the air impelling unit 10 is arranged to rotate.

In this instance the fresh air supply means 12 is open at its outer end to the atmosphere but is here introduced at its inner end through an opening 56 in a vehicle dash 57 to the rear of the blower casing 33 direct to the outer end of the air impelling unit 10 where it overlies intake openings 33a, of the blower casing 33. This casing envelopes the driving motor 30, and blower fan 32 mounted upon the motor shaft and concentrically surrounding the motor. A second propeller fan 31 is also mounted upon the same end of the motor shaft as the blower fan 32. Outlets 37 from the circumference of the blower casing 33 are arranged to be covered by conduits for delivery of air under pressure to the vehicle windshield or other desired location. In the fresh air supply channel 55 a butterfly valve 58 is arranged to be actuated from the outside thereof to control movement of air therethrough.

Figure 6:
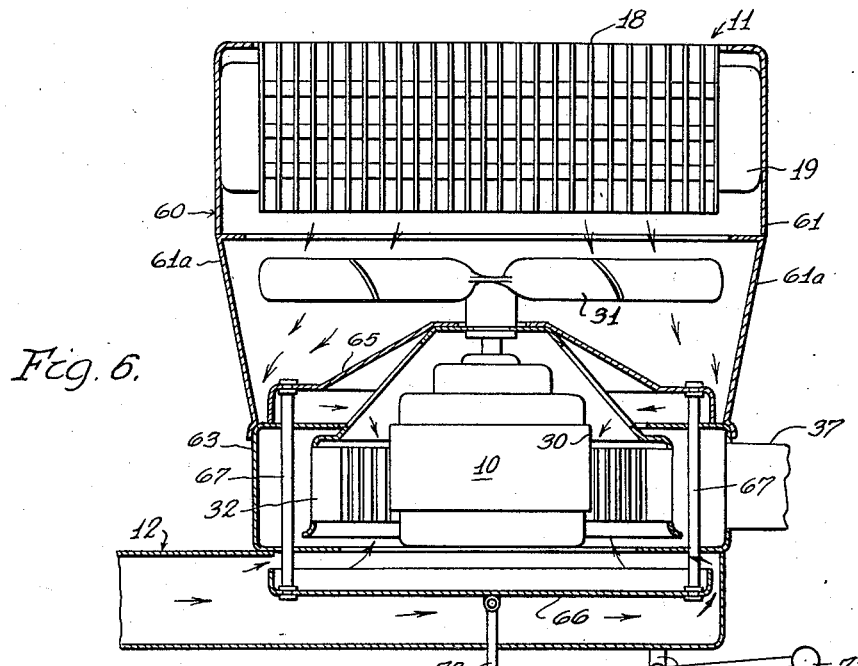
Fig. 6 is a vertical sectional view through a further modified heater structure illustrating adjustable housing means for the air impeller for selective operation thereof in conjunction with a fresh air ventilating system.

The further modified, heat-exchanger, generally designated 60, shown in a vertical sectional view in Fig. 6 has alternative means for supplying unheated fresh air or heated recirculated air to the vehicle windshield. In this instance the air impelling unit 10 has been altered, but the heat-exchange unit 11 and the fresh air supply means 12 have substantially the same form. That is to say, the heat-exchanger 60 has a casing 61 surrounding the marginal edges of the core 18, of the heat-exchange unit 11, having header tanks 19 upon opposite ends thereof, and spaced casing straps 61a which support the blower casing 63 in depending relation providing air outlet openings therebetween. The fresh air supply means 12 is secured in spaced relation to the underside of the blower casing 63 surrounding the air inlet opening therein. Upon opposite ends of the blower casing are valve plates 65 and 66 secured to each other by tie rods 67 slidably journalled in openings in the opposite casing walls. A lever 70 pivotally fulcrumed at 71 on the fresh air supply means 12 has a hand hold 72 at one end and linkage 73 connected to the opposite end and pivoted at the center of the valve plate 66 to effect movement thereof. The air impelling unit 10 consists of a motor 30 and fans 31 and 32 mounted upon one end of the shaft thereof with the motor and centrifugal fan 32 disposed in the casing 63.

When the propeller fan 31 is operated air to be heated is drawn from the vehicle through the spaces between the casing straps 61a and discharged in a heated air stream for delivery to the passenger compartment, and the centrifugal fan 32 is running under full load, so that air supplied through the fresh air means 12, as previously described, is admitted to the lower end of the centrifugal fan by adjusting the lever 70 so that the valve plate 66 is spaced from the blower casing wall, as shown, and under these conditions fresh unheated air may be delivered by the blower casing 63 through the outlet 37 thereof to the windshield for defogging the same. If it is necessary to defrost the windshield the lever 70 is moved so that the valve plate 66 is seated against the lower casing wall and the opposite valve plate 65 raised therefrom. In this adjustment of the device, heated air discharge from the propeller fan 31 is drawn in through the upper end of the casing by the upper end of the centrifugal fan and delivered in heated condition from the blower casing to the windshield for defrosting.

From the foregoing disclosures it will be seen there has been described several novel forms of alternative heat-exchanger constructions for supplying fresh tempered air and/or unheated air for treating a vehicle windshield accomplishing, among other things, the objects and advantages of the invention first enumerated. However, it is not intended to be limited to the several specific embodiments herein disclosed, which are merely for purposes of illustration, as many formal modifications will present themselves in practice to those skilled in the art to which this invention relates, without departing from the spirit and substance of the broad invention, as defined by the scope of the following claims.

What I claim is:

1. In a device for air conditioning a motor vehicle compartment, a heat-exchange core, a shell disposed around the core to define front and back openings at the corresponding faces of the core, a fan operable by driving means to move air of the vehicle to be heated through said core, a second fan driven by said driving means and enclosed in a separate blower housing, said driving means consisting of an electric motor concentrically nested within said second fan in fixed relation thereto and supported within the blower housing to drive both said fans in one direction with concurrently uniform air moving efficiency, a fresh air supply means including an air channel connected directly to an inlet in one end of said blower housing, a second inlet opening in the opposite end of said blower housing whereby said second fan will draw untempered air from one end of the surrounding blower housing and tempered air from the opposite end of the housing moved through the core by said first fan and discharged adjacent said second inlet opening in the housing, and manual valve means adjacent the connection of the fresh air supply means to the inlet end of said blower housing receiving untempered air adapted to control tempering of the air supply to one end of said blower housing whereby untempered and tempered air may be blended and moved by said second fan or only tempered air, selectively.

2. In a device for air conditioning a motor vehicle compartment, a heat-exchange core, a shell disposed around the core to define front and back openings at the corresponding faces of the core, a fan operable by driving means to move air of the vehicle to be heated through said core, a second fan driven by said driving means and enclosed in a separate blower housing, said driving means consisting of an electric motor supported within said blower housing to drive both said fans in one direction with concurrently uniform air moving efficiently, a fresh air supply means including an air channel connected directly to an inlet in one end of said blower housing, a second inlet opening in the opposite end of said blower housing whereby said second fan will draw untempered air from one end of the surrounding blower housing and tempered air from the opposite end of the housing moved through the core by said first fan and discharged adjacent said second inlet opening in the housing, manual valve means adjacent the connection of the fresh air supply means to the inlet end of said blower housing receiving untempered air adapted to control tempering of the air supply to one end of said blower housing whereby untempered and tempered air may be blended and moved by said second fan or only tempered air, selectively, and said manual valve means comprised of a circular housing and including arcuately spaced relatively rotatable valve means for selective registration with the eye of the blower at one end thereof.

HOWARD J. FINDLEY.